United States Patent [19]

Collier

[11] Patent Number: 4,724,059
[45] Date of Patent: Feb. 9, 1988

[54] AUTOMATED CHLORINE GENERATOR

[75] Inventor: Richard B. Collier, Richmond, Canada

[73] Assignee: Purichlor Technology Ltd., Canada

[21] Appl. No.: 884,334

[22] Filed: Jul. 11, 1986

[51] Int. Cl.[4] .................... C25B 15/02; C25B 9/00; C25B 15/08

[52] U.S. Cl. .................................. 204/229; 204/266; 204/263

[58] Field of Search .............. 204/228, 229, 252–258, 204/263–266, 98, 128, 230, 129

[56] References Cited

U.S. PATENT DOCUMENTS

| 4,097,356 | 6/1978 | Yates | 204/266 X |
| 4,119,517 | 10/1978 | Hengst | 204/229 |
| 4,229,272 | 10/1980 | Yates | 204/229 X |
| 4,324,635 | 4/1982 | Sweeney | 204/263 X |
| 4,329,215 | 5/1982 | Scoville | 204/229 |
| 4,439,295 | 3/1984 | Richards | 204/229 |
| 4,472,256 | 9/1984 | Hilbig | 204/128 X |
| 4,533,451 | 8/1985 | Kumazawa | 204/229 |
| 4,555,323 | 11/1985 | Collier | 204/258 |
| 4,599,159 | 7/1986 | Hilbig | 204/263 X |

Primary Examiner—Donald R. Valentine
Attorney, Agent, or Firm—Townsend and Townsend

[57] ABSTRACT

An automated chlorine generator is provided having a power source, an electrolytic cell able to generate chlorine by the electrolysis of sodium chloride. An anode and a cathode are provided each mounted in a separate compartment with chlorine generation in the anode compartment and hydrogen generation in the cathode compartment, the compartments being in communication through an ion permeable membrane. A mixing container having a first compartment to receive hydrogen and chlorine from the cell is provided with an outlet for water in a second compartment, in communication with the first and having an inlet for water and a float valve to control the inlet. Conductivity probes are used for detecting liquid content in the anode and the cathode compartments as well as a flushing system for draining the anode and cathode compartments. A vacuum chamber in the mixing container is used for maintaining chlorine gas under vacuum which is detected by means of other conductivity probes to detect the loss of vacuum in the vacuum chamber. An oxidation refuction potential probe is used at the water inlet for measuring the chlorine concentration in the water.

8 Claims, 8 Drawing Figures

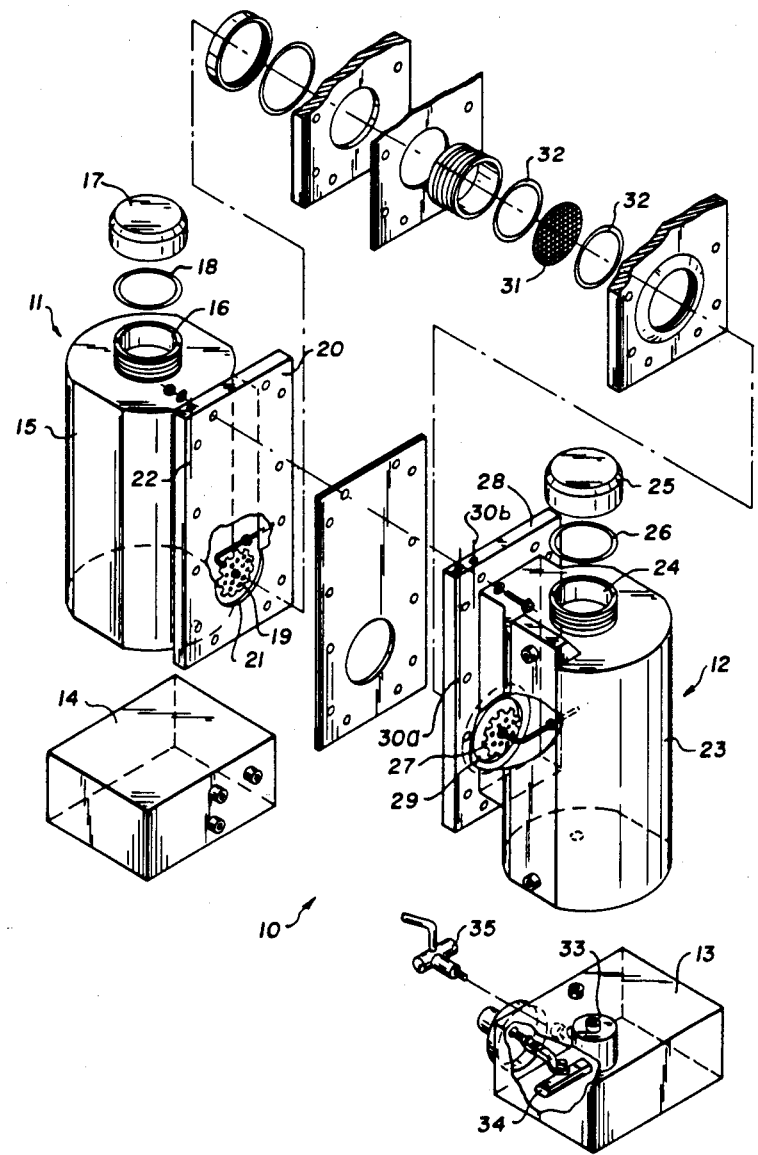

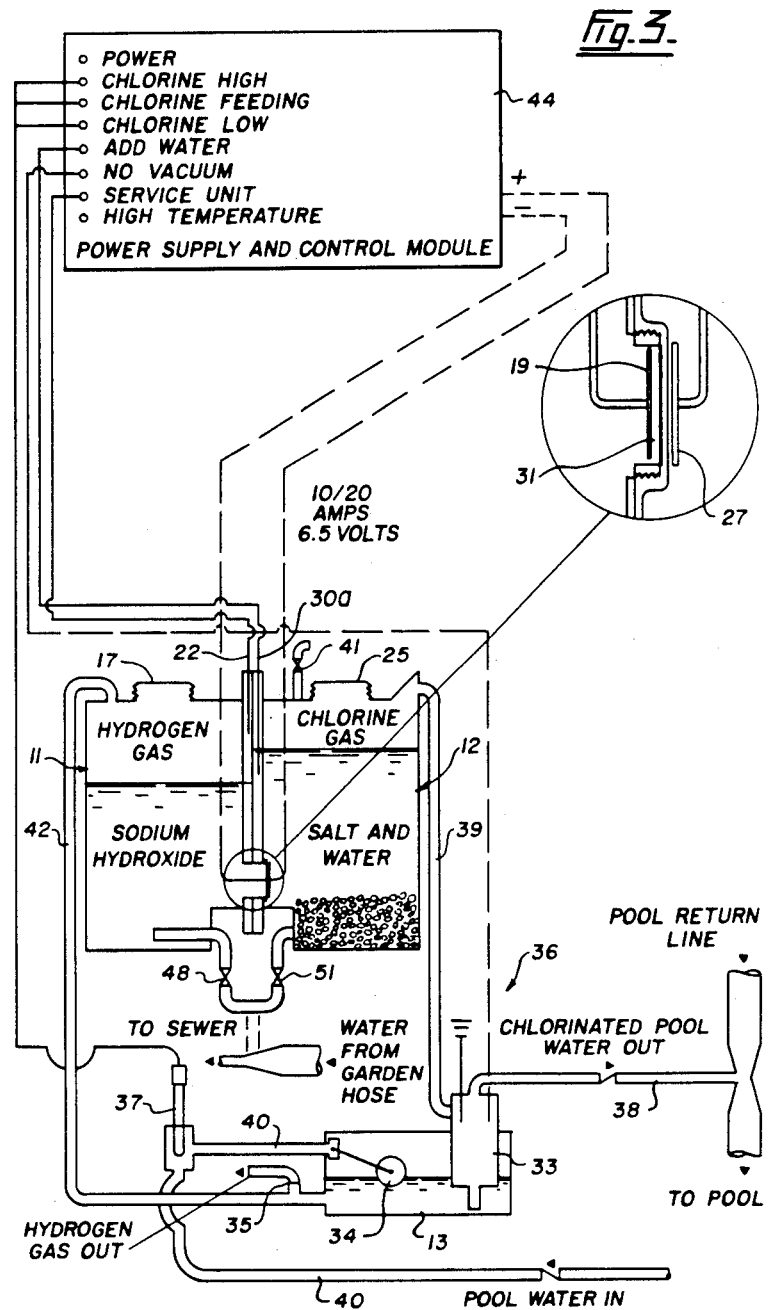

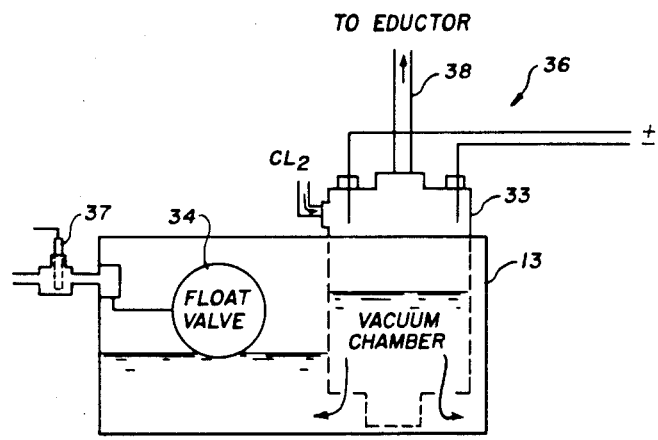
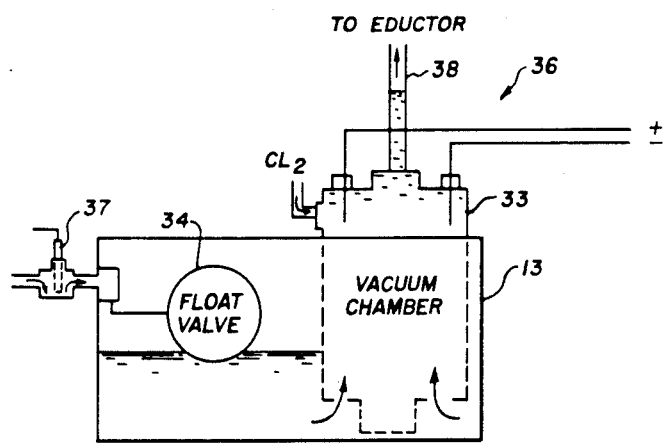

ABOVE GROUND CONNECTION

BELOW GROUND CONNECTION

AUTOMATED CHLORINE GENERATOR

FIELD OF THE INVENTION

This invention relates to systems to generate chlorine to disinfect a body of water and more particularly to an automated chlorine generator able to control automatically the chlorine content in water.

DESCRIPTION OF THE PRIOR ART

A number of chlorine generation systems which can control chlorine by either timing the electrolysis, by measuring the chlorine pressure in the electrolytic cell in which the chlorine is generated or by chemical sensors have been disclosed in applicant's U.S. Pat. No. 4,555,323.

However, fully automated chlorine generators have so far been unavailable since there always existed the need to remove residue chemicals left over after the electrolysis process was completed. This process is not only dangerous but also time consuming.

SUMMARY OF THE INVENTION

It is therefore an object of the present invention to provide an automated chlorine generator which will maintain the correct amount of chlorine in water.

Another object of the present invention is to provide an automated chlorine generator which is self-activated when chlorine is required.

Another object of the present invention is to provide an automated chlorine generator which will provide automatic indication and shutdown of the unit when salt and water are needed.

Another object of the present invention is to provide an automated chlorine generator having a flushing system able to remove residue chemicals from the system after electrolysis process is completed.

In yet another object of the present invention is to provide an automated chlorine generator which is provided in a compact and self-contained unit.

Accordingly, an aspect of the present invention is to provide an automated chlorine generator having a power source, an electrolytic cell able to generate chlorine by the electrolysis of sodium chloride and having an anode and a cathode, each mounted in a separate compartment with chlorine generation in the anode compartment and hydrogen generation in the cathode compartment, the compartments being in communication through an ion permeable membrane, a mixing container having a first compartment to receive hydrogen and chlorine from the cell and provided with an outlet for water and a second compartment, in communication with the first and having an inlet for water, a float valve to control the inlet, the improvement comprising: first sensing means for detecting liquid content in said anode compartment; second sensing means for detecting liquid content in said cathode compartment; flushing means for draining said anode and cathode compartments; vacuum chamber in said mixing container for maintaining chlorine gas under vacuum; third sensing means in said mixing container for detecting loss of vacuum in said vacuum chamber; and fourth sensing means at said water inlet for measuring chlorine concentration in said water.

DRAWINGS

Particular embodiments of the invention will be understood in conjunction with the accompanying drawings in which:

FIG. 1 is an exploded view of the generator compartment arrangements used in the present invention;

FIG. 3 is a schematic illustration of the automated chlorine generator used in the present invention;

FIGS. 4a and 4b are sectional illustrations of the mixing compartment used in the present invention.

DESCRIPTION OF THE PREFERRED EMBODIMENTS

Figure 2A:
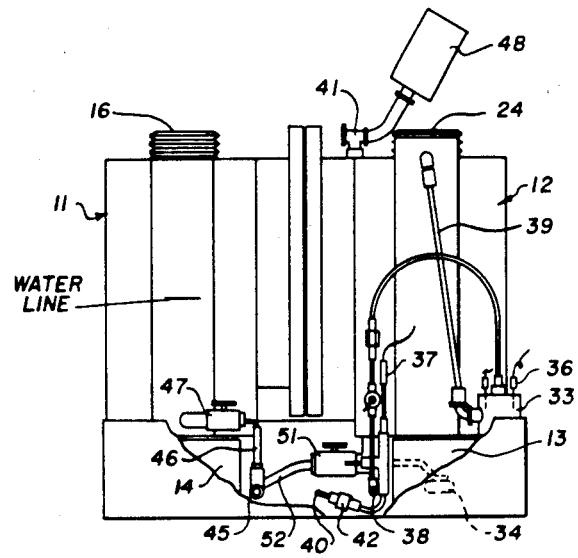
FIGS. 2a and 2b are front and rear views, respectively, of the chlorine generator showing the various conduit lines connected thereon.

Referring now to FIG. 1 we have shown at reference numeral 10 the basic structural elements composing the automated chlorine generator of the present invention. The unit basically consists of a cathode cell 11, an anode cell 12, a mixing canister 13 positioned below the anode cell 12 and an overflow canister 14 positioned below the cathode cell 11. A flushing system interconnecting the various canisters is more clearly shown in FIG. 2.

The cathode cell 11 consists of cathode canister 15 having an opening 16, a closing cap 17 and seal 18. A cathode 19 is positioned within cathode canister 15 and electrically connected to a power source (not shown). Integral with cathode canister 15 is a connecting wall 20 having aperture 21 through which the cathode 19 is inserted. Connecting wall 20 is provided with a conductivity probe 22 which is positioned just above cathode 19.

Anode cell 12 includes anode canister 23 having opening 24, closing cap 25 and seal 26. An anode 27 secured within anode cell 12 is electrically connected to a power source (not shown). Integral with anode canister 23 is a connecting wall 28 having aperture 29 through which anode 27 is inserted. Connecting wall 28 is also provided with a conductivity probe 30a positioned just above anode 27 and may also be provided with a second conductivity probe 30b shorter in length than probe 30a as is discussed below.

Cathode cell 11 is secured to anode cell 12 at their respective connecting walls. An ion permeable membrane 31 is secured within aperture 21 of connecting wall 20 and aperture 29 of connecting wall 28 by means of a pair of GORTEX TM seals 32 aligned on the same axis. A similar sealing arrangement was previously disclosed in applicant's U.S. Pat. No. 4,555,323 and need not be discussed further.

Connecting wall 28 of anode cell 12 is provided with a titanium conductivity probe 30a to measure the water level in the anode canister 23 as well as the sodium and water transfer from the anode cell to the cathode cell. When the water falls below the end of the probe, the circuit becomes open and thereby cuts the power source to the generator (not shown) powering the generator. This ensures that the water level always remain above the anode 27. Depletion of water in the anode cell is one of two things that can damage the anode cell, depletion of salt is the other. This anode is made of platinum/lidium coated titanium metal.

As more clearly shown in FIGS. 4a and 4b, mixing canister 13 is provided with a vacuum chamber 33, a float valve 34. When the vacuum in the vacuum chamber 33 is lost for any reason i.e. the anode cap 25 is left off, or the circulation pump loses prime, the water in the vacuum chamber will fall, (see FIG. 4a) causing conductivity probes 36 to open the circuit and shut down the power system on the chlorine generator.

When vacuum is regained the water will rise in the vacuum chamber to close the circuit and turn on the power supply to the chlorine generator (see FIG. 4b).

Water enters the mixing canister 13 via an ORP probe 37 or oxidation reduction potential probe. An ORP probe can directly measure the electrical potential resulting from oxidizing agents such as chlorine and bromine in the water. Accordingly, the signal provided by an ORP probe can be used to monitor the chlorine level in water. Float valve 34 controls the amount of water in the mixing canister 13. In the vacuum chamber 33 of mixing canister 13 water is held up by the vacuum created by an eductor (not shown) on return line 38. The conductivity probes 36 in the vacuum chamber will conduct when the water closes the circuit.

Figure 2B:
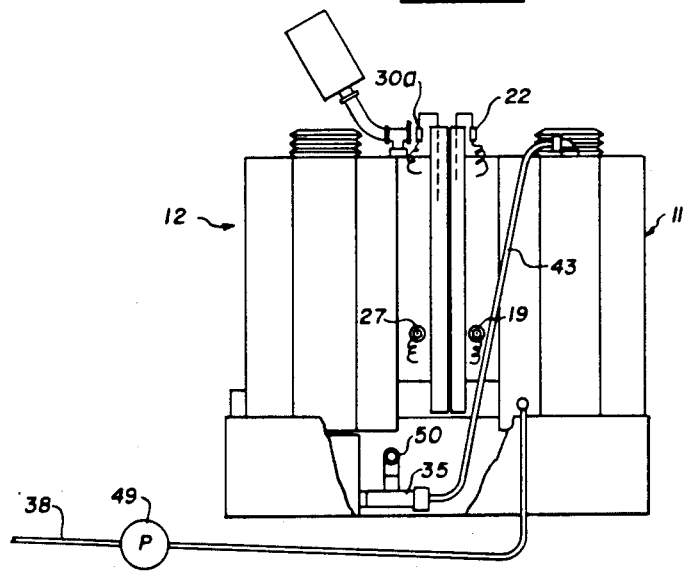

Referring now to FIGS. 2a, 2b and 3, in operation, salt (sodium chloride) is broken down in the unit by electrolysis to produce a small amount of chlorine gas. The chlorine gas is then dissolved in water where it forms hypochlorous acid, a strong oxidizing agent which can be used for example to disinfect pool water and prevent the growth of algae. Salt and water are placed in the anode cell 12 to form a brine solution. Water is added as required by means of valve 41. The brine solution is then split by electrolysis into oxygen, sodium and chlorine. The chlorine and oxygen are generated as a gas in the anode cell 12 and are drawn off under vacuum via conduit 39 to vacuum chamber 33 of mixing canister 13 where they are dissolved in a small amount of water which flows via conduit 40 through mixing canister 13 and is returned as chlorinated water via conduit 38.

Upon mixing, for example, with water for a swimming pool, the chlorine gas forms hypochlorous acid and hydrochloric acid. The hypochlorous acid is dissipated by heat and light and is used up as it disinfects and cleans the pool. The hydrochloric acid byproduct is neutralized by natural alkalinity in the pool water. The alkalinity used in this reaction is usually replaced when makeup water is added to the pool to replenish water loss through evaporation and filter backwashing. In soft water areas with low natural alkalinity it may be necessary to occasionally add some sodium bicarbonate (baking soda) to replace the alkalinity used.

A PH probe 42 can also be provided which would be used in conjunction with a pump such that if the probe detects low PH, a pump 49 could be used to feed caustic soda or sodium hydroxide solution from cathode cell 11 to the water return line 38. The PH level could therefore be automatically maintained between say, 7 and 7.8. In the unlikely event that the PH level were to drop below 7 a warning light or buzzer could be used to alert an operator.

The PH probe 42 could be positioned along with the ORP probe on the incoming water line 40 of the generator.

The sodium produced in the anode cell 12 together with a small amount of water, are drawn through a special membrane 31 to the cathode cell 11. This special membrane can be made of material such as Nafion ™.

The sodium reacts with water already in the cathode cell 11 to form sodium hydroxide (caustic soda) and hydrogen.

The small amount of hydrogen produced in the cathode cell is discharged harmlessly via conduit 43 by a vent 50 to atmosphere via a water trap or flame arrestor 35.

As the salt and water in the anode cell 11 are used up, conductivity probe 30a detects when the water has fallen to a preset level. The probe switches off the unit, sounds an alarm and lights a light on the power supply and control module 44 (see FIG. 3) advising the user that the unit requires the addition of water. The alarm and light will go off leaving the unit ready for operation as soon as the probe detects an increase in water level.

The power supply and control module 44 consists of a tranformer and electronic circuitry and comprises voltage compactors, an ORP controller, a system status display and the like. The ORP controller maintains a preset chlorine level in the water by turning the unit on and off as chlorine is required. The system status display contains the alarm circuitry and can include eight warning lights; power on, chlorine high, chlorine feeding, chlorine low, add water, no vacuum, service unit and high temperature. These various electronic components and their associated circuitry is well known in this art and need not be discussed further.

As sodium and water are added to the cathode cell 11, the volume of sodium hydroxide increases until conductivity probe 22 detects when the cell is full of liquid. The probe switches off the unit, sounds an alarm and lights a light on the power supply and control module 44 advising the user that the unit requires servicing. Servicing consists of draining the cathode and anode cells 11 and 12 respectively, refilling the anode cell 12 with salt and water and adding water to the cathode cell 11 leaving the unit ready for operation. The alarm and light will go off only after the unit has been turned off and the liquid level in the cathode cell 11 has been lowered. The only maintenance required is the replacement of the salt charge, draining of the cathode cell 11 and the occasional addition of water to the anode cell 12 by means of funnel 48 and valve 41.

A special feature of the present invention is the use of a flushing system which eliminates the necessity for a user to handle any chemical other than salt when servicing the unit.

An eductor such as shown in applicant's aforementioned U.S. patent is supplied with the unit for draining the anode and cathode cells 11 and 12 respectively. When used for swimming pool applications, the eductor is connected to a garden hose (not shown) and drain fitting 45.

By opening valve 47, NaOH solution will be able to drain via conduit 46. When the garden hose is turned on and water passes through the eductor it will draw out the NaOH solution. Also, when drain valve 51 on conduit 52, connected between anode cell 12 and drain fitting 45 is opened, the flushing eductor will pull the anolite solution out of the cell to dilute with fresh water and harmlessly discharge into the sewage drain.

Because a vacuum in the anode cell 12 is created by the flushing eductor, water is pulled up conduit 39 to flush out the anolite solution (heavy concentration of chlorine).

As long as the recirculation pump is running there is always a vacuum in anode cell 12.

Water can be added by opening valve 41 and vacuum will pull water into anode cell 12 to refill as required. Conductivity probe 30b will conduct when the water level has reached the probe and alarm the user that the cell is full.

Figure 5A:
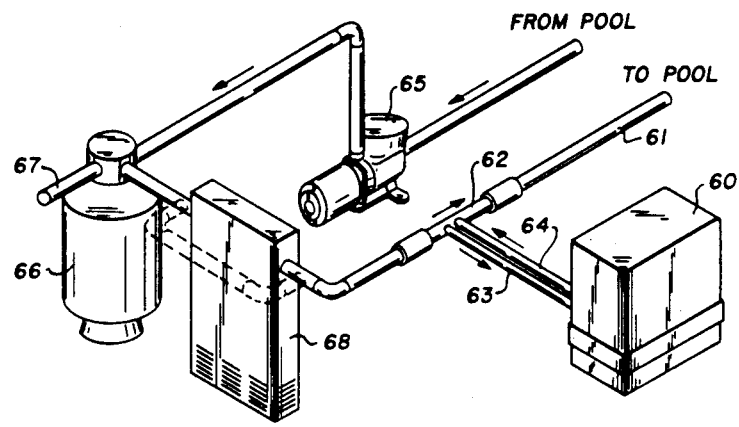
FIGS. 5a and 5b are illustrative embodiments of the chlorine generator connected for swimming pool applications.
Figure 5B:
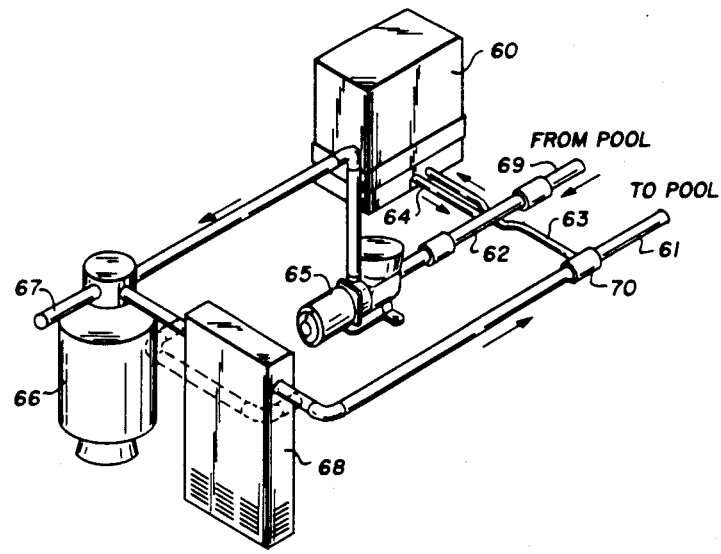

FIGS. 5a and 5b depict how the chlorine generator of the present invention would be used when the system is applied to swimming chlorination.

FIG. 5a shows the chlorine generator 60 connected on the return line to the pool 61 when provided in an above ground configuration. Eductor 62 allows pool water to be supplied to generator 60 along conduit 63 and conversely allow chlorinated pool water from the generator to be returned to the pool via conduit 64.

The remaining components represent the basic elements used in a pool filtration system and includes a pump 65 a filter 66 with backwash line 67 and a heater 68.

FIG. 5b shows how the chlorine generator 60 would be connected in a below ground configuration. Eductor 62 would however be connected to the main conduit line 69 from the pool such that chlorinated water would be mixed with pool water from the pool and fed through the filtration system before returning to the pool via conduit or return line 61. A second eductor 70 would be required to allow generator 60 to be supplied with pool water.

Since the ORP probe 37 (FIG. 2 and 3) is used to control and maintain a preset chlorine level in the pool water, then instead of being connected at the pool intake line 63 as for an above ground configuration, in a below ground configuration, the ORP probe would be connected on the main conduit line 69 in order to properly measure chlorine content in the pool water.

The automated chlorine generator of the present invention can adequately be used in other applications as well which otherwise would not be possible or practical.

For example, air conditioning systems in commercial and industrial buildings usually incorporate recirculating cooling water which passes through a cooling tower. The cooling water in the system cannot be allowed to form slime on the piping as this will result in a large drop in heat exchanger efficiency. In addition, several instances of "Legionaires Disease" have been linked to pool water treatment in air conditioning systems. Chlorination is an ideal method for treating and disinfecting this cooling water.

Also, water for drip irrigation systems is usually chlorinated. Chlorine is a deterrent to algae growth which will clog the tiny drip holes in irrigation lines.

The automated chlorine generator can also be used in sewage treatment. Sewage treatment plants are usually required by law to disinfect their effluent prior to discharge. Small sewage treatment plants often use bleach or calcium hypochlorite for disinfection. These products are expensive and awkward to handle.

As will be apparent to those skilled in the art in light of the foregoing disclosure, many alterations and modifications are possible in the practise of this invention without departing from the spirit or scope thereof. Accordingly, the scope of the invention is to be construed in accordance with the substance defined by the following claims.

I claim:

1. An automated chlorine generator having a power source, an electrolytic cell able to generate chlorine by the electrolysis of sodium chloride and having an anode and a cathode, each mounted in a separate compartment with chlorine generation in the anode compartment and hydrogen generation in the cathode compartment, the compartments being in communication through an ion permeable membrane, a mixing container having a first compartment to receive hydrogen and chlorine from the cell and provided with an outlet for water and a second compartment, in communication with the first and having an inlet for water, a float valve to control the inlet, the improvement comprising:
    a first conductivity probe for detecting presence of liquid in said anode compartment;
    a second conductivity probe for detecting presence of liquid in said cathode compartment;
    flushing means for draining said anode and cathode compartments;
    a vacuum chamber in said mixing container for maintaining chlorine gas under vacuum;
    a third conductivity probe in said mixing container for detecting loss of vacuum in said vacuum chamber; and
    an oxidation reduction potential probe for measuring chlorine concentration in said water.

2. A generator as defined in claim 1 wherein controller means is provided which is electrically connected to said power source, said first, second and third conductivity probes and said oxidation reduction potential probe such that said chlorine generator can be controlled upon sensing a predetermined condition from one of said probes.

3. A generator as defined in claim 1 wherein sensing means is provided for monitoring PH level in said pool water.

4. A generator as defined in claim 3 wherein said sensing means comprises a PH probe positioned at said oxidation reduction potential probe.

5. A generator as defined in claim 4 wherein pumping means is used in conjunction with said PH probe to feed sodium hydroxide from said cathode cell to said water outlet so as to maintain said water PH level between 7 and 7.8

6. A generator as defined in claim 1 wherein flame arresting means is provided where hydrogen is received at said mixing container.

7. A generator as defined in claim 6 wherein said flame arresting means comprises a venting conduit partly submerged in water for venting hydrogen as it is generated from said cathode compartment.

8. A generator as defined in claim 1 wherein said flushing means comprises a first conduit connected to eductor means, a second conduit connected between said first conduit and said anode compartment, and a third conduit connected between said first conduit and said cathode compartment wherein as fluid passes through said eductor means, liquid from said anode and cathode compartments is drawn out through said first conduit via said second and third conduits.

* * * * *